Jan. 25, 1927.
A. GIANNASI
1,615,693
CONTROL APPARATUS
Filed Sept. 23, 1924  2 Sheets-Sheet 1
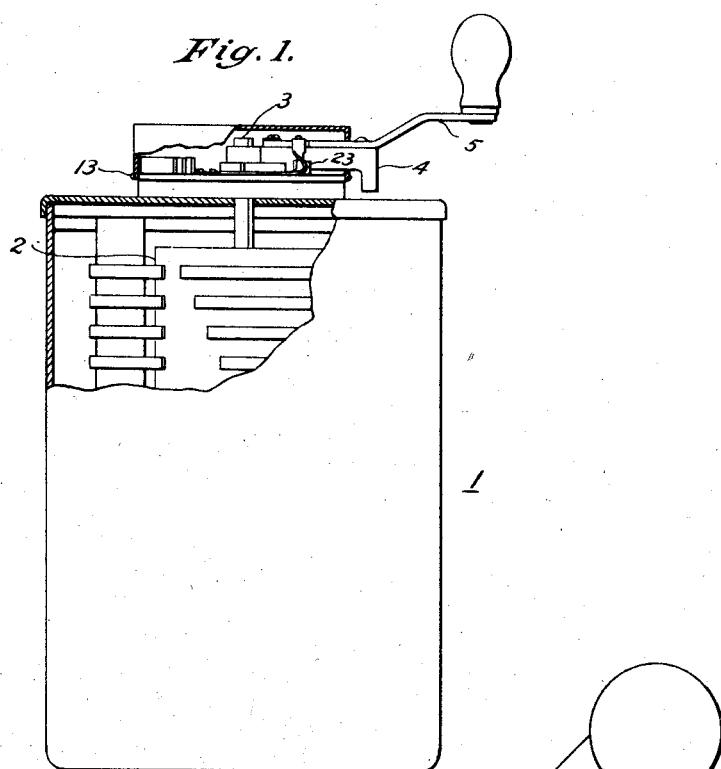
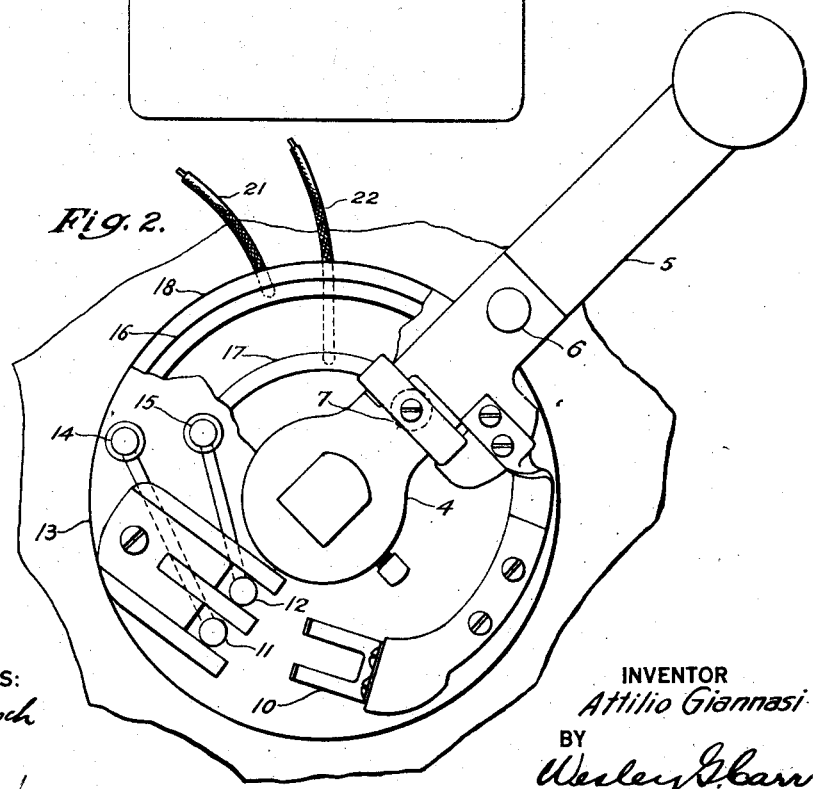
INVENTOR
Attilio Giannasi
BY
Wesley G. Carr
ATTORNEY Jan. 25, 1927.
A. GIANNASI
1,615,693
CONTROL APPARATUS
Filed Sept. 23, 1924
2 Sheets-Sheet 2
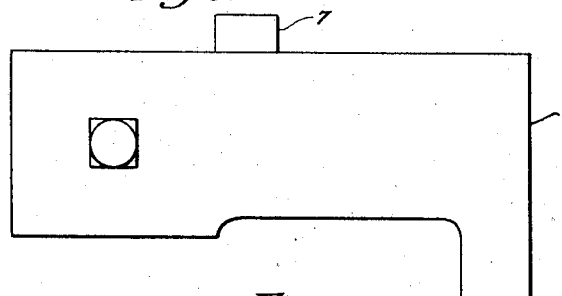
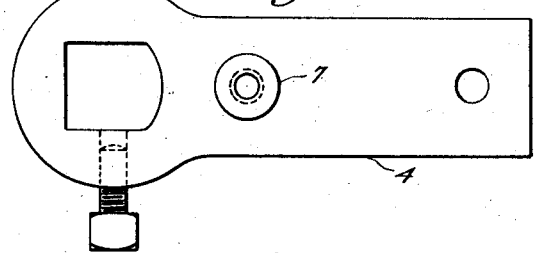
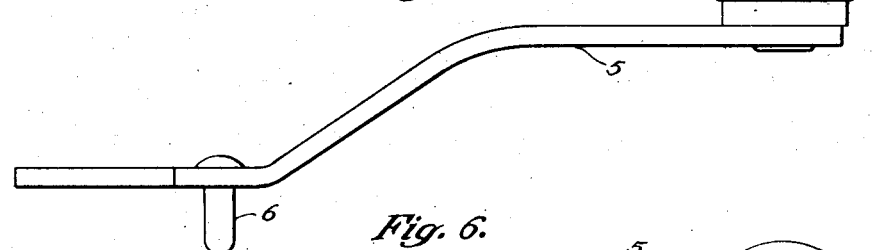
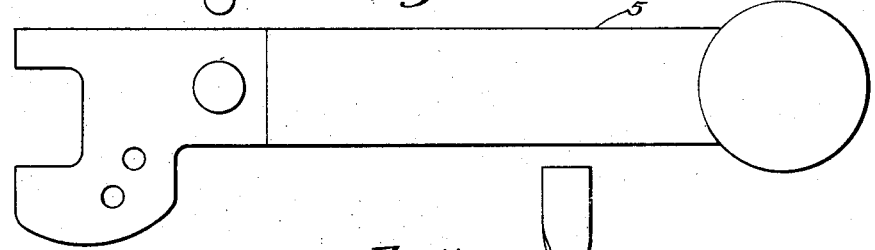
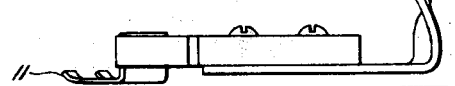
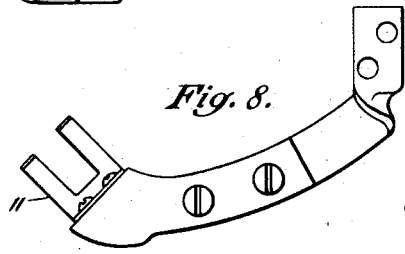
INVENTOR
*Attilio Giannasi*
BY
*Wesley G. Carr*
ATTORNEY
WITNESSES:

Patented Jan. 25, 1927.

1,615,693

UNITED STATES PATENT OFFICE.

ATTILIO GIANNASI, OF RICHMOND, VIRGINIA.

CONTROL APPARATUS.

Application filed September 23, 1924. Serial No. 739,445.

My invention relates to control apparatus and it has particular relation to control devices for operating railway motors.

The object of my invention is to provide a drum controller that is so constructed as to eliminate destructive arcing at the contact members.

In accordance with my invention the drum is provided with reversing and accelerating switch members and an auxiliary device for controlling a magnetically operable line switch or contactor. The controller is so constructed that the line switch is opened prior to the opening of the reversing switches whereby the destructive arc is ruptured by the line switch, and not by the drum switch members.

My invention will be best understood by reference to the accompanying drawing in which—

Figure 1 is a view in elevation of apparatus embodying my invention, part of the casing being broken away, Fig. 2 is a plan view of the apparatus illustrated in Fig. 1, Figs. 3 and 4 are side and plan views respectively of the drum shaft operating lever, Figs. 5 and 6 are side and plan views of the controller operating handle, and Figs. 7 and 8 are side and plan views respectively of an auxiliary switch member.

With reference to the accompanying drawings, the controller 1 is provided with a rotatable drum 2 having reversing and accelerating switch members of familiar character. The drum shaft 3 is provided with an operating lever 4 and an operating handle 5 mounted upon the lever 4 and capable of a certain amount of lost-motion with respect to the movement of lever 4. The handle 5 is pivotally mounted on the lever 4 and rotatable on a shaft 6. The end of the operating handle 5 is slotted to engage a pin 7 which is mounted in such manner that the handle 5 may rotate on its bearing 6 a predetermined amount in either direction prior to engagement with the pin 7.

By means of the lost motion thus provided, movement is imparted to the handle 5 in either direction prior to movement of the lever 4. An auxiliary switch 10 is carried by the handle 5 and is insulated therefrom. This contact member is adapted to engage a pair of contact members 11 and 12 that are carried by a movable insulating disk 13, rotatably mounted on the drum shaft 3. These members are electrically connected to brushes 14 and 15 that engage a pair of collector rings 16 and 17 mounted on a stationary insulating disk 18. Current is supplied to collector rings 16 and 17 through conductors 21 and 22 whereby energy is supplied to contact members 11 and 12 that are adapted to be bridged by the auxiliary switch 10. The lever 4 engages a channel member 23 fastened to the disk 13 by which arrangement said lever rotates the disk and the drum 2, simultaneously.

Assuming the controller to be in its illustrated inoperative position, the auxiliary switch 10 is first actuated to engage contact members 11 and 12 upon the initial movement of the handle 5 whereupon current traverses conductors 21 and 22 for closing the line switch. Further movement of the handle 5 effects rotation of the lever 4 and the drum shaft 3 after the handle engages the pin 7, thereby actuating the drum 2 which is provided for starting and accelerating the motor. Motion is also imparted to the disk 13 by means of the lever 4. The time element of the line switch in closing is such that the drum reversing switch members are first closed manually through the short movement of the handle 5 from the "off" position to the first running position.

The disk 13 moves in a "forward" or a "reverse" direction in accordance with the movement of the switch 10 and current is at the same time supplied from current collectors 16 and 17 through the brushes 14 and 15.

When the controller is returned to its "off" position to interrupt the motor circuit, the handle 5 is moved in a counter-clockwise direction whereby switch 10 is disengaged from contact members 11 and 12 to effect the opening of the line switch prior to any movement of drum 2. This operation is effected by reason of the lost-motion connection between the handle 5 and the drum operating lever 4. Continued movement of the handle 5 toward the initial or "off" position effects rotation of the drum 2 to reinsert the starting resistance and open the reversing switches in a familiar manner.

The advantage of rupturing the motor circuit through a line switch, separate, and in addition thereto, my controller is of compact design so that it may be readily incorporated within the space limitations of present standard railway equipment.

I have illustrated my invention in preferred form, but modifications of the details thereof may readily occur to one skilled in the art. I desire, therefore, that only such limitations shall be imposed as are indicated by the appended claims.

I claim as my invention:

1. In an electric controller, the combination with a rotatable drum shaft and an operating lever therefor, of a lost-motion handle mounted on said lever, a switch actuated by said handle independently of said lever, a rotatable contact member for engaging said switch member and a current collector for energizing said rotatable member and permitting actuation of said switch prior to rotation of said drum shaft.

2. In an electric controller, the combination with a rotatable drum shaft and an operating lever therefor, of a lost-motion handle mounted on said lever, a switch actuated by said handle independently of said lever, a rotatable contact member for engaging said switch member, means for effecting rotation of said member and a current collector for energizing said rotatable member and permitting actuation of said switch prior to rotation of said drum shaft.

In testimony whereof, I have hereunto subscribed my name this 12th day of September 1924.

ATTILIO GIANNASI.